Jan. 17, 1961    H. M. GRAHAM ET AL    2,968,149
FLIGHT CONTROL MEANS

Filed April 26, 1957    3 Sheets-Sheet 1

INVENTOR.
Harry M. Graham
Kenneth T. Murty
BY
AGENT

INVENTOR.
Harry M. Graham
Kenneth T. Murty

BY                    AGENT

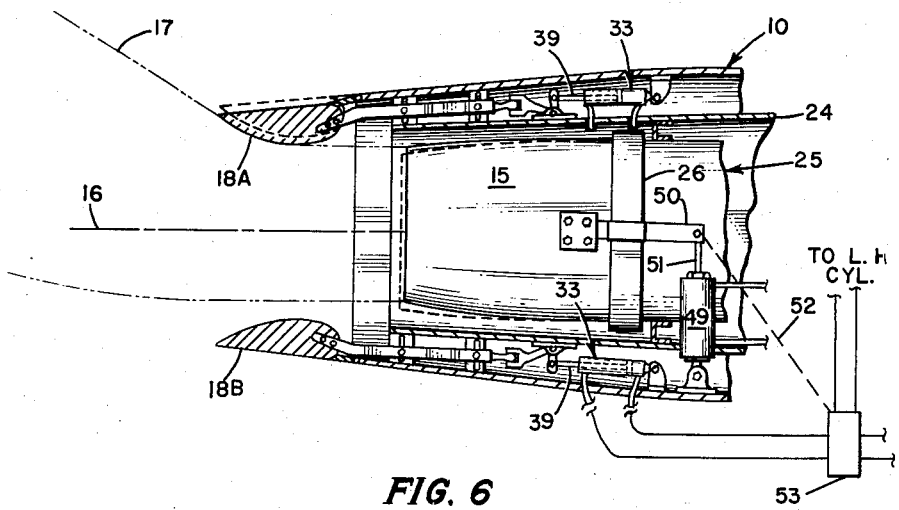
FIG. 6
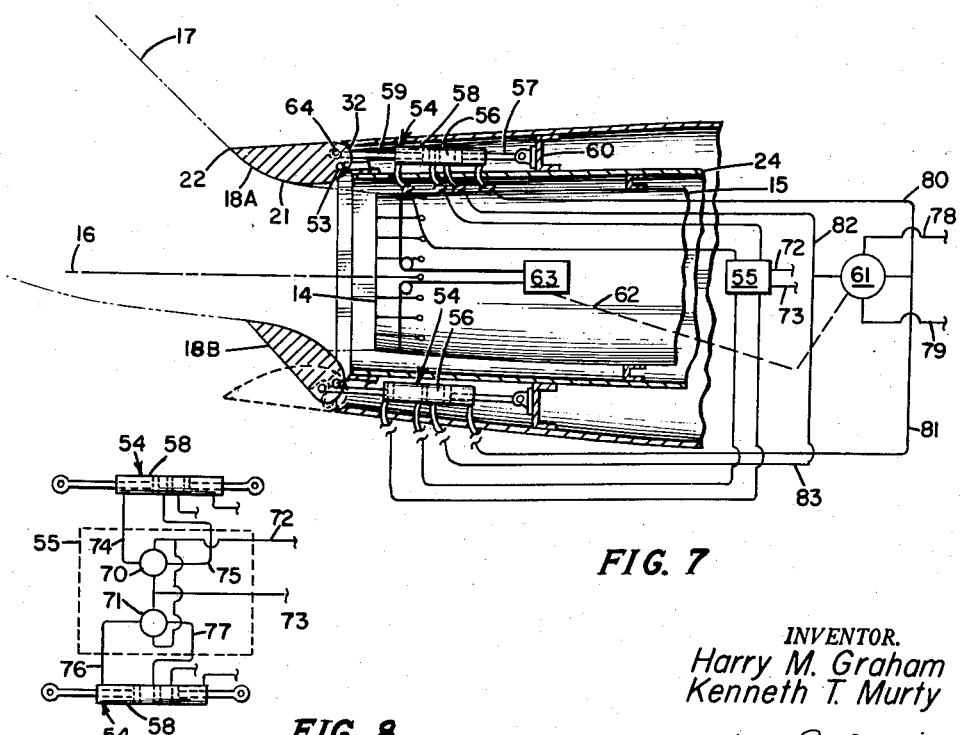
FIG. 7
FIG. 8
INVENTOR.
Harry M. Graham
Kenneth T. Murty
BY 
AGENT United States Patent Office 2,968,149
Patented Jan. 17, 1961

2,968,149

FLIGHT CONTROL MEANS

Harry M. Graham, Dallas, and Kenneth T. Murty, Arlington, Tex., assignors to Chance Vought Aircraft, Incorporated, Dallas, Tex., a corporation of Delaware Filed Apr. 26, 1957, Ser. No. 655,293

17 Claims. (Cl. 60—35.55)

This invention relates to the flight control of jet-propelled aircraft and more particularly to means for providing forces for the control of such aircraft.

Many devices have been proposed for ensuring the recovery of aircraft from spins and stalls, but in spite of the expenditure of much inventive effort toward this end, the inability to recover from such flight conditions continues as an important cause of crashes in which many aircraft and not a few lives are lost. High-performance military aircraft must at times be maneuvered in ways conducive to stalls and spins and hence from this standpoint are prone to stall and spin difficulties. Such problems may occur, however, in other aircraft as well, and a general need exists for completely adequate means for implementing the recovery for aircraft from stalls, spins, and related flight conditions.

In addition, as the altitude of flight is increased, the control forces yielded by vertical and horizontal control surfaces tends to decrease because of the decreasing density of the atmosphere, and at quite high altitudes may become marginal or even entirely inadequate, particularly where it is desired to make quick changes in flight attitude.

Accordingly, it is a major object of this invention to provide adequate means for effecting the recovery of an aircraft from flight conditions such as spins and stalls.

Another object is to provide a device enabling the operator of an aircraft to make direct utilization of the propulsive thrust of a jet engine for opposing and halting a spin.

An additional object is to provide a device for quickly bringing the aircraft to a nose-down attitude when desired.

A further object is to provide practical and improved means for the deflection of a propulsive jet whereby strong forces tending to rotate the aircraft about its vertical or horizontal axes may be applied for spin recovery or at other times when a strong control force is needed.

Another object is to provide valuable and novel means for deflecting a propulsive jet after its discharge from a nozzle.

Yet another object is to provide means which provide adequate control forces at extremely high altitudes.

A still further object is to provide means usable with and highly improving the results obtained by arrangements in which a nozzle is deflected to discharge a jet at a desired angle to the longitudinal centerline of the aircraft for imposing a flight-control force thereon.

Still another object is to provide a device coacting with a propulsive jet and coordinated with the operation of variable-area nozzle from which said jet is discharged.

An additional object is to provide means such as stated above which are relatively light in weight, require a minimum of space within the aircraft, and are inexpensive and simple to construct and operate.

Other objects and advantages will be apparent from the specification and claims and from the accompanying drawings which illustrate an embodiment of the invention.

Briefly described, the invention comprises a blast vane or flap mounted on an aircraft at one side of and extending rearwardly of a nozzle through which an engine discharges a propulsive jet along an axis extending rearwardly relative to the aircraft. The flap has an inner face (that is, a face adjacent the jet) and is so located relative to the nozzle that, in normal flight, the inner face is near, yet spaced from, the jet. As seen in a cross-section of the flap, the inner face is curved or otherwise shaped in accordance with the general peripheral contour of the jet; as seen in longitudinal section, the inner face most closely approaches the rearwardly directed axis at a point in the vicinity of the forward end of the flap, and rearwardly from that point diverges by a progressively increasing interval from that axis. When contact is established between the periphery of the jet and the inner surface of the vane, the jet leaves its flow-axis followed until the instant of contact and flows along a new axis still closer to the flap. The shift of flow-direction is accompanied by the imposition of strong forces on the aircraft, which forces have a sizeable component normal to the above-mentioned rearwardly directed axis and may be used with profit for control of the aircraft as, notably, for opposing and halting a spin or for high altitude control. By using a plurality of vanes or flaps spaced around the nozzle, such control forces may be made available as desired in any of a number of directions.

Means are provided for establishing two desired spatial relationships between the flap and jet. In the first of these relationships, the inner face of the flap is radially spaced from and out of contact with the jet; in the second, contact is established between the inner face and the jet. In one embodiment of the invention, the flap-to-jet contact is attained by means which deflect or direct the jet away from the rearwardly extending axis and into peripheral contact with the inner face. In a modification, means are provided which move the flap transversely until the desired contact occurs. In another modification, the nozzle is deflectable toward the flap, and this deflection may be with or without concurrent movement of the flap toward the nozzle. When a variable-area nozzle is employed, the interval between the flap and jet when they lie in the first spatial relationship to each other is maintained at a suitable value by means preferably coordinated with whatever mechanism is employed for varying the nozzle area and operative for shifting the position of the flap in accordance with changes in nozzle diameter.

In the drawing,

Figure 6 shows an arrangement wherein both the nozzle and the flaps are movable for establishing flap-to-jet contact;

Figure 7 shows a flap pivotable into contact with the jet stream for deflection of the same against another flap; and Figure 8 is a schematic representation of one form, provided only by way of example, of control means more generally shown in Figure 7.

Figure 1:
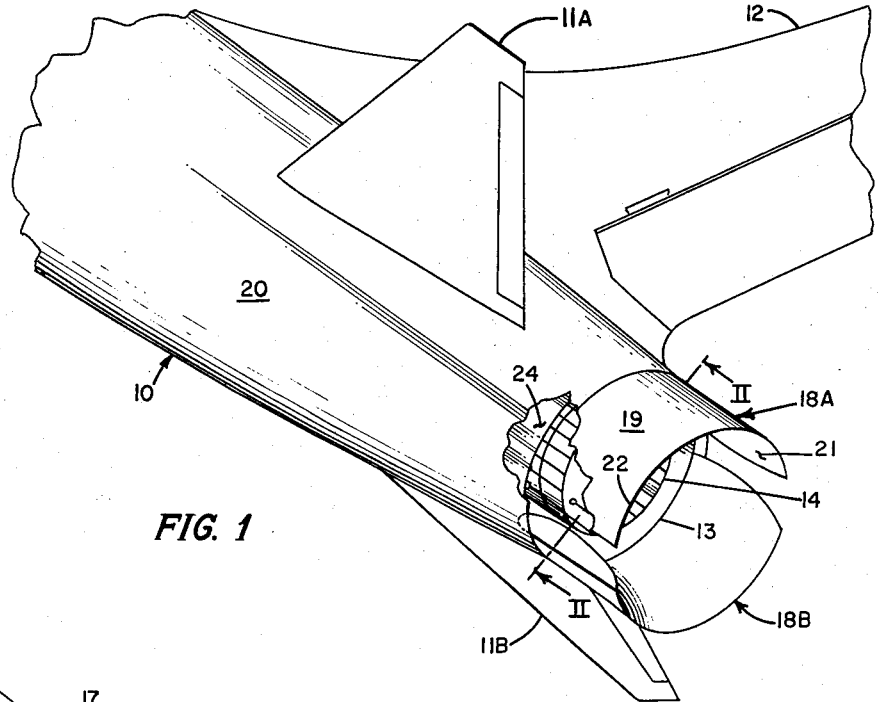
Figure 1 is a perspective view, looking up and forward, of the aft portion of an aircraft on which are provided left- and right-hand flaps according to the invention.

Referring now to the drawing, Figure 1 shows the aft section of an aircraft fuselage 10 which is provided with horizontal and vertical tail surfaces 11A, 11B, 12 of any chosen sort. Although they may provide entirely adequate directional and longitudinal stability in normal flight, it is well known that the unfavorable nature of airflow at the tail surfaces at the times of stalls and spins and at extremely high altitudes strongly tends to render them ineffective at such times in supplying vertically and/or laterally directed forces at the aft end of the fuselage 10. This is unfortunate, since the ready availability, as required, of sufficiently strong longitudinal and lateral control forces could implement the safe termination of many stall and spin conditions in which, for lack of such control forces, destruction of the aircraft is unavoidable, and could permit satisfactory flight at high altitudes or under other conditions in which the aircraft tends to become in sufficiently controllable.

The fuselage 10 has an aft-end, rearwardly directed opening which, in the particular example, preferably is defined by the aft edge or rim 13 of a shroud 24 enclosed coaxially within the fuselage and in turn enclosing aft portions of a jet engine (not shown) connected with and exhausting high-velocity gases through a nozzle whose open aft end 14 communicates with the atmosphere through the shroud opening 13. The nozzle opening 14, as desired, may be of fixed area, or alternatively may be of a sort wherein its diameter, hence its area, is varied in accordance with certain operating conditions for obtaining the most efficient discharge of the engine gases; for example, the nozzle may be of the sort shown in U.S. Patent No. 2,603,062, issued July 15, 1952, to R. E. Weiler et al., or of any other desired variable-area construction, a number being well known.

Figure 2:
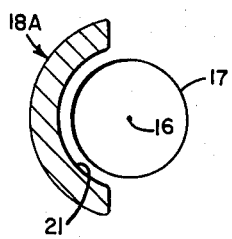
Figure 2 is a cross-sectional view of one of the flaps taken along line II—II of Figure 1 and particularly showing the shaping of the flap's inner face in conformity with the peripheral contour of the jet.

With reference to Figure 2 wherein the fuselage 10 is shown in a horizontally taken longitudinal section, forwardly propelling forces may be applied on the fuselage 10 by positioning the nozzle 15 (as will be explained) for discharging therefrom a jet 17 of engine exhaust gases along an axis 16 extending straight rearwardly relative to the aircraft. Since the nozzle opening 14 of the specific example is circular, the jet 17 discharge therefrom tends to be of circular cross-section; an otherwise shaped nozzle producing a differently shaped jet could of course be employed where desired.

A flap 18A mounted on the aircraft 10 in radially spaced relation to the rearwardly extending axis 16, for example, to the left of the nozzle opening 14, extends well aft of the discharge location of the jet (that is, the nozzle opening 14), and serves as an essential part of the flight-directing apparatus. Reference is made again to Figure 1. As will be explained, strong control forces are provided, when needed, by coaction of the flap 18A with the propulsive jet. These forces are in a direction determined by the location of the flap 18A about the circle defined by the nozzle opening 14. Positioned to the left of the nozzle opening 14, the control force supplied by the flap 18A will be to the right and will tend to turn the aircraft of which the fuselage 10 is a part to the left. A second flap 18B positioned diametrically opposite the left-hand flap 18A can supply forces tending to implement a turn to the right, while a flap located above or below the nozzle opening 14 will produce a force tending to raise or lower the nose of the aircraft. It will be noted that this action is made possible by a special construction (to be described) of the flap 18A or 18B and is radically different from that of previous blast flaps whose action is such that, to quote an example, a flap mounted to the left of a nozzle and brought into coaction with a jet issuing therefrom tends to cause a turning of the aircraft to the right, which results is opposite to that caused by the turning force supplied by the left-hand flap 18A of the present invention.

Figure 3:
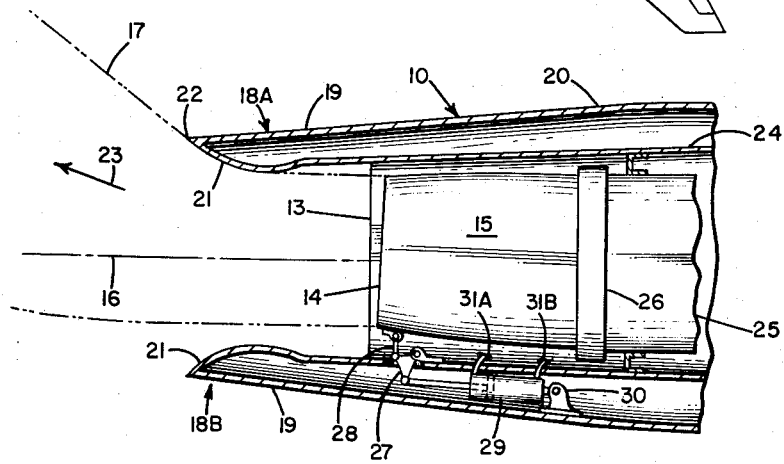
Figure 3 is a diagrammatic view taken in longitudinal section through the aft portion of the fuselage and showing an embodiment of the invention wherein the flaps are in fixed relation to the fuselage.

The flap 18A has an outer face 19 which is shaped and located to render it, as far as practicable, aerodynamically continuous with the fuselage skin 20. If the flap 18A is fixed relative to the fuselage 10, its outer face 19 may be an actual continuation of the skin 20, and its inner face 21, which lies adjacent the nozzle opening 14 and axis 16, may be smoothly continuous with the shroud whose rim appears at 13. Where the flap 18A is movable, it will most of the time occupy a neutral position, in which it should be smoothly faired by the fuselage skin 20 or by special fairing means to the fuselage contour. It is desirable that the flap 18A also be faired as well as is expedient when in any other position. The flap trailing edge 22 preferably is square-cut, by which term is meant that all points of the neutrally positioned flap 18A lie in one vertical plane normal to the rearwardly extending axis 16 (Figure 3). While its thickness is not critical, the trailing edge 22 (Figure 1) preferably is quite thin. A nose section (to be described) may join the outer and inner faces 19, 21, but is not required when the flap 18A is fixed relative to the fuselage 10. The flap 18A is disposed generally parallel to the rearwardly extending axis 16 (Figure 3).

Referring to Figures 1 and 2, the inner face 21, as seen in cross-section taken normal to the rearwardly extending axis 16 and flap chord, is preferably shaped to substantially correspond to and complement the peripheral shape of the jet. The periphery of the jet, that is, the envelope marking the boundary between the fast-moving exhaust gases and the air outside the jet, is generally indicated at 17 and is circular. Consequently, the inner face 21 is preferably of dished or arcuate shape in correspondence therewith, and the spanwise centerline of the flap 18A preferably defines a substantially arcuate curve.

As seen in longitudinal section, for instance in Figure 3, the inner face 21 most closely approaches the rearwardly extending axis 16 at a point near the nozzle opening 14 and the forward end of the flap 18A. Aft of this point, the inner surface 21 progressively and continuously diverges from the axis 16 until the trailing edge 22 is reached. This divergence may be accomplished by making the inner face 21 in the form of a series of surfaces which, in the view shown in Figure 3, would appear flat and disposed at angles to each other and to the rearwardly extending axis 16, the angle of successive surfaces to the axis increasing toward the trailing edge 22. In a preferred form of the flap 18A, however, the inner face 21 is smoothly curved to provide the desired divergence.

The flaps 18A, 18B with their distinctive inner surfaces 21 should not be confused with and are not interchangeable with previously used blast flaps.

A slight and not significant curvature of some portions of their inner faces has appeared on previously known blast flaps made of sheet material as a result of rounding off their flat front and rear edges. In other cases, somewhat thicker flaps have been tapered at their leading and/or trailing edges to ease the bluntness thereof. For the purposes of the present invention, the use of such flaps should not be attempted, for they are not at all efficacious in the required capacity and would defeat those purposes. Instead, a flap must be used wherein a progressively increasing divergence of the inner face 21 from the axis 16 is displayed; such divergence must be relatively pronounced, and its extent will be established, in particular applications, according to how much deflection of the propulsive jet 17 by the inner face is desired. The amount of deflection obtainable is related to the size of the angle between the rearwardly extending axis 16 and a tangent to the inner surface 21 at the flap trailing edge 22.

Figure 5:
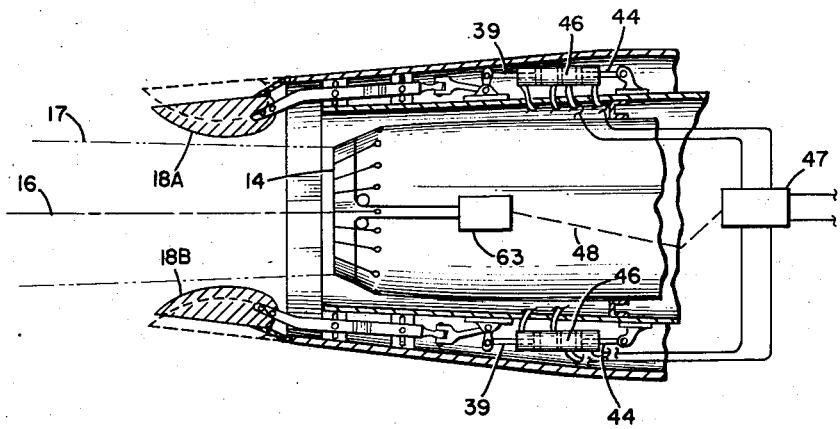
Figure 5 shows the flaps of Figure 4 moved in their neutral position to a location corresponding to another adjustment in area of the nozzle.

When the aircraft 10 needs no control force from the flap 18A, there is established between the flap and jet 17 a relationship of such sort that the inner face 21 is radially spaced from, generally concentric with, adjacent, and out of contact with the periphery of the jet 17. An example of this relationship is shown in Figure 5 and is generally typical of said relationship between the jet and all the modifications shown in the various figures of the drawing. The jet is free to flow straight to the rear along the axis 16 without being significantly influenced by either flap 18A or 18B. When a control force which the flap 18A can implement is needed, a second spatial relationship is set up between the jet 17 and a selected one of the flaps 18A, 18B, and this relationship is of a sort wherein contact is effected between the periphery of the jet 17 and, for example, the flap 18A as shown in Figure 3. Means, of course, must be provided for establishing these relationships; more fully described in later paragraphs, they may comprise means which direct the jet 17 into contact with the selected flap 18A or 18B and/or means which move the flap 18A or 18B into contact with the jet 17. Once the contact is effected, certain results follow. To give a typical example, once the jet 17 and left-hand flap 18 (Figure 3) experience mutual contact, the jet leaves the axis along which it flowed at the instant of contact and follows the flap inner face 21, thus assuming a flow along a new axis radially displaced toward the flap from the old axis 16. This phenomenon is related to, and may properly be stated to be an aspect of, the Coanda effect, which is typified by the adhesion, under certain conditions, of a rapidly flowing gas to a surface diverging away from an original flow-axis of the gas. Although the Coanda effect has been discussed in a number of publications, it will be noted that the shape of the envelope of the unobstructed jet 17 (Figure 5) is determined by factors which include the effect exerted by the entrainment of air from outside the jet about and along the jet periphery. Entrainment is prevented along one side by the contacting surface 21 (Figure 3), thus effecting a reduction in pressure in the region between the jet 17 and surface 21; meanwhile, since the other side remains in contact with the surrounding air, entrainment continues on that side and little if any pressure reduction occurs. The pressure difference thus induced causes the jet 17 to follow the surface 21. Since the latter, as shown, progressively diverges, within certain practical limits, from the original flow-direction 16 of the jet 17, the latter is diverted. Moving in a new direction generally indicated by the arrow 23, the jet 17 exerts a thrust having a sizeable component whose direction is normal to and toward the rearwardly extending axis 16, and this component is equivalent to a force strongly urging a turning of the aircraft. Establishing contact between the left-hand flap 18A and the jet 17 thus deflects the jet to the left and turns the aircraft 10 to the left. When its desired effect on the attitude or heading of the aircraft 10 has been accomplished, the control force contributed by the flap is terminated by re-establishing the first, spaced relationship between the jet 17 and flap 18A, thus ending the influence of the flap on the jet, which resumes its flow along the rearwardly extending axis 16.

In case a control force is needed for turning the aircraft 10 to the right or halting a spin to the left, contact similarly may be established between the jet 17 (Figure 5) and the right-hand flap 18B, thus deflecting the jet to the right. A flap made as described also may be mounted below the nozzle and profitably employed for prompt lowering of the nose of the aircraft 10 for bringing the latter out of a stall. Such a flap is illustrated at 18B in Figure 3, which figure momentarily and for purposes of providing a description and a showing in the drawing of upper and lower flaps is considered to be a vertical (rather than a horizontal) longitudinal section. It will be seen that, with the flap 18B mounted below the nozzle 15, establishing contact between its inner surface 21 and the jet 17 would deflect the jet downwardly, thus quickly placing a strong upward force on the aft end of the fuselage 10 and nosing the aircraft downwardly. It also is conceivable that the certain availability of strong, downwardly directed control forces on the aft end of the fuselage 10 may at times be most desirable. Such forces may be provided by use of an upper flap 18A. For control forces in all the directions described, four similar flaps spaced 90 degrees apart may be employed. In all the modifications of the invention shown throughout the drawings appended hereto, the basic features of construction and operation of all the flaps shown are the same, whatever their positions around the rearwardly extending axis 16. Certain differences in the flaps 18A, 18B which are peculiar to particular modifications of the invention or which illustrate alternate modes of construction will be described in later paragraphs. In connection with each modification shown and described, where use of a left-hand flap 18A for applying a leftward turning force on the aircraft is described, it will be understood that this description is typical of and is intended to illustrate the manner of securing a corresponding control force for turning or directing the aircraft to the right, upwardly, or downwardly by providing and using a similar, appropriately located flap.

Again regarding Figure 3 as a horizontal, longitudinal section through the fuselage 10, the left- and right-hand flaps 18A, 18B are rigidly fixed relative to the fuselage skin 20 and shroud 24 with which their respective outer and inner faces 19, 21 are continuous. The means selectively operable for establishing the previously defined first and second spatial relations between the jet 17 and flaps 18A, 18B comprises a movable nozzle 15 and a nozzle deflecting means. The nozzle 15 may be of any suitable design; if preferred, it may be adapted for deflection in a manner similar to that taught in U.S. Patent No. 2,499,401, issued March 7, 1950, to J. H. Madden, and means such as disclosed in that same patent may be utilized for its deflection as required relative to the rearwardly extending axis 16, the aft end of the nozzle 15 being placed near the rim 13 of the shroud 24 and the latter being made large enough to accommodate without interference the necessary shifts in position of the nozzle 15 and jet 17. On the other hand, the engine section 25 preceding the nozzle 15 may be rigidly mounted in the aircraft 10, and a flexible construction may be used as generally indicated at 26 for connection of the nozzle 15 thereto and for allowing the nozzle to be deflected to left and right. The nozzle deflecting means may comprise a pivotally mounted bell crank 27 connected by a link 28 to one side of the nozzle 15, and an actuator 29 mounted on a fixed item 30 and pivotally connected at one end to the bell crank 27. It will be understood that the bell crank 27 and link 28 are merely illustrative of a mechanism for deflecting the nozzle, and that any other suitable mechanism may be employed, and further that the actuator 29, in common with all other actuating means mentioned previously and later, need not be hydraulically energized, but that actuators utilizing energy supplied from any convenient source may be employed. In the particular hydraulic motor 29 shown, ports 31A, 31B allow the flow of fluid between the motor 29 and a source of hydraulic pressure through suitable tubing (not shown).

During flight when no control force contributed by the flaps 18A, 18B is needed, fluid is supplied to the motor 29 when and as required to maintain the nozzle 15 in alignment with the rearwardly extending axis 16, along which axis the jet accordingly flows in the previously defined first relationship with the flaps 18A, 18B. When deflection of the jet 17 for producing a maximum control force for turning the aircraft to the left (or for halting a spin to the right) is desired, the motor 29 is caused to deflect the nozzle 15 to the left enough to direct the jet 17 away from the rearwardly extending axis and into contact at its periphery with the inner face 21 of the left-hand flap, thus establishing a second jet-to-flap relationship. As previously described, maximum deflection of the jet 17 by the flap 18A is effected, thus producing a maximum control force which effects the desired turn or stops the spin. When it is no longer needed, the control force is discontinued by causing the motor 29 to move the nozzle 15 back into alignment with the rearwardly extending axis 16, thus breaking the jet-to-flap contact and causing the jet 17 again to flow along the axis 16.

Less-than-maximum control forces may be supplied by conventional control surfaces provided on the aircraft and/or by appropriately deflecting the jet toward, but not into contact with, one or the other of the flaps 18A, 18B. Relatively light control of the aircraft also may be accomplished by use of a flap 18A or 18B by making and quickly breaking the jet-to-flap contact as many times as required to effect the desired change in flight attitude or condition. The amount of control force obtained also may be varied by varying the mass-flow rate of the jet from the nozzle by adjusting the fuel input, etc. of the engine.

It will be readily apparent that some difficulties and impracticabilities formerly encountered in the deflection of nozzles are greatly minimized by the present invention, and this advantage is attributable to the co-action of the novel flaps 18A, 18B with the jet 17. In most, if not all, aircraft in which an attempt has been made to steer the same by appropriately deflecting the jet nozzle, securing a sufficient amplitude of nozzle deflection within the airframe space available for the nozzle and its deflecting mechanism has been a problem. The nozzle deflections unavoidably were large, since such were necessary in order to obtain control forces of sufficient magnitude. Meanwhile, a definite correlation tended to exist between the amplitude of deflection and certain other troubles: the larger the deflection, the more likely was the appearance, for example, of actuator difficulties and troubles such as leakage, binding, and corrosion in the necessary flexible joint or joints for the nozzle. In the present invention, these and other difficulties are greatly minimized since the nozzle 15 need not be deflected very far to obtain a maximum of control force, but only far enough to bring the jet 17 into peripheral contact with an already relatively closely adjacent flap 18A or 18B. The nozzle 15 therefore is much easier to house, is subject to greatly lessened tendencies to malfunction, and the ability to supply a strong control force by means of the jet is much improved.

Figure 4:
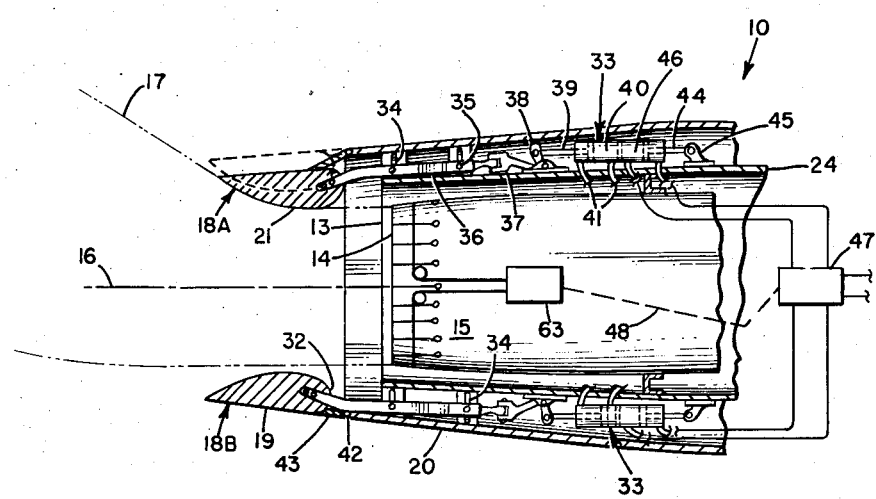
Figure 4 is similar to Figure 3 and shows movable flaps, one in its neutral position corresponding to one adjustment in area of the exhaust nozzle, and the other moved into contact with the jet.

As shown in Figure 4, the nozzle 15 may be non-deflectable relative to the rearwardly extending axis 16 and the flaps 18A, 18B may be movably mounted on the aircraft 10 for translation toward or laterally away from the axis 16. The term "translation" is always employed herein in its ordinary sense of "motion" (of a body) in which all the points of the moving body have at any instant the same velocity and direction of motion. Not made integrally with the fuselage skin 20 and the shroud 24, the outer and inner faces 19, 21 of each flap 18A, 18B are joined, as shown at 32, by a leading edge or nose section which may be rounded much in the manner of a rather blunt leading edge of an airfoil. The means selectively operable for establishing the previously explained first and second spatial relations between each respective flap 18A or 18B and the jet 17 comprises a first flap-moving means which may include a motor 33 and linkage (to be described). Any suitable flap mounting and moving means may be employed, those shown being given merely for example. Rigidly mounted members have outwardly extending slots 34 which slideably mount pins 35 rigidly attached to a bar 36 which lies in the space between the shroud 24 and skin 20 and on whose aft end is rigidly mounted the left-hand flap 18A. The linkage may comprise a pivotally mounted bent lever with a bifurcate aft arm 37 which engages the forward end of the bar 36 and further has a forward arm 38 to which is connected a piston rod 39 of the hydraulic motor 33, the latter being pivotally mounted on a fixed item 45. A chamber 40 of the motor 33 is connected to a hydraulic power source (not shown) through a pair of tubes 41.

Actuation of the motor 33 for forward motion of the rod 39 effects transverse movement of the bar 36 and translation of the flap 18A in a direction leading away from the rearwardly extending axis 16, and locates the flap 18A in a first position, shown in broken line, wherein the flap inner face 21 is relatively near but entirely out of contact with the jet 17. Rearward motion of the rod 39 similarly moves the flap 18A transversely and in the opposite direction into a second position, shown in solid line, wherein the jet 17 contacts the inner face 21 and follows the latter as previously described. The jet 17 may be brought into contact with a flap 18A or 18B for as long a time as required for producing a strong, relatively sustained control force (for example, for halting a spin), or the contact may be made briefly for as many times as required for correcting a yaw or making a turn.

The right-hand flap 18B is mounted similarly to the left-hand flap 18A, and is similarly provided with a first flap-moving means 33 such as that, just described, provided for the left-hand flap. To maintain the best practicable fairing of the flaps 18A, 18B to the fuselage 10, a portion of the fuselage skin 20 immediately ahead of each respective flap 18A, 18B may be hinged as at 42, and the hinged portion 43 spring-loaded or otherwise made to follow against the flap 18A or 18B as the latter is moved toward and away from the rearwardly extending axis 16.

Variable-area exhaust nozzles may be employed in any of the arrangements shown and described herein in which the flaps 18A, 18B are movable. It will be noted, however, that an increase in nozzle area which effects a considerable increase in jet diameter toward the flaps may eliminate the neutral-position interval between the jet 17 and flaps 18A, 18B and cause the jet to flow in continuous contact with the flaps. Although various useful arrangements have previously been proposed wherein blast flaps lie continuously in contact with a jet, examination will reveal that they are of different constructions lacking inner surfaces shaped as is the face 21 described herein, and are intended to operate in an entirely different manner. Thus, while the continuous flap-to-jet contact may be desirable in other inventions, it would entirely defeat the purpose of the present invention in which the specially constructed flaps 18A, 18B must be kept entirely separate from the jet 17 except when it is desired to cause one of the flaps 18A or 18B to exert a control force. Proper separation of the flaps and jet is maintained by the second flap-moving means, which now will be described.

The second flap-moving means may comprise any suitable mechanism which is coordinated with the mechanism 63 for varying the nozzle area and is operative for making the necessary adjustments of the flaps 18A, 18B relative to nozzle diameter while the flaps are neutrally positioned, that is, while the previously defined first spatial relation is established between them and the jet 17. As the jet diameter is increased, the flaps 18A, 18B are both moved an appropriate distance away from the rearwardly extending axis 16 in order that the necessary interval between the jet 17 and each of the flaps 18A, 18B may be maintained. When the nozzle area is decreased, the flaps 18A, 18B are correspondingly moved inwardly in order that the interval may not become so great that excessive time would be consumed in moving either of the flaps 18A or 18B against the jet 17 by action of the first flap-moving means motors 33. As an example of a mechanism which may be employed in the second flap-moving means, each hydraulic motor 33 may be of a double-chambered sort having an aft piston and rod 39 such as already described and connected to the fixed item 45 through the rod 44 of a forward piston mounted in a separate chamber 46 connected through a control means 47 to the hydraulic power source. The control means 47 contains a suitable valve (not shown) for governing the flow of fluid between the chambers 46 and a hydraulic power source, and is connected by a linkage, symbolized by the dotted line 48, to an actuator 63 employed for adjustment of the nozzle area. Through the connection or linkage 48, the control means 47 is coordinated with the actuator 63 and effects necessary extensions and retractions of the forward piston rods 44 for adjusting the location of the flaps 18A, 18B in their neutral position. For example, as shown, in Figure 5, a reduction in diameter of the nozzle opening 14 is accompanied by a corresponding inward movement of the flaps 18A, 18B from their locations shown in dotted lines and corresponding to the nozzle adjustment shown in Figure 4 to their solid-line locations corresponding to the reduced nozzle diameter shown in Figure 5. Since they are independent of the forward rods 44, the aft rods 39 (members of the first flap-moving means) may be extended at any time to move their respectively associated flaps 18A, 18B into contact with the jet 17, only one of the aft rods 39 being extended for that purpose at any one time.

The modification of the invention shown in Figure 6 employs transversely translatable flaps 18A, 18B such as described above in connection with Figure 4. Flap actuating means are provided, and these correspond to the first flap moving means including the aft piston 39 of Figure 4. A deflectable nozzle 15 similar to the corresponding item shown in Figure 3 also is utilized. Of course, any suitable means may be employed which will accomplish the desired deflections of the nozzle 15; for convenience in illustration, a nozzle deflecting means is shown which comprises a hydraulic motor 49 extending transversely of the fuselage 10 and mounted at one end on any fixed item. An arm 50 rigidly mounted on the deflectable nozzle 15 extends forward of the flexible joint 26 to a connection with the motor 49. Energization of the motor 49 for moving the arm 50 to a point at or near the middle of its range of travel moves the nozzle 15 to a first position wherein the nozzle is aligned with, and the jet 17 is directed along, the axis 16 which extends directly rearwardly from the aircraft 10, in which position the nozzle 15 remains for normal flight. For providing a strong control force tending to turn the aircraft to the left, the motor 49 is caused to pull the arm 50 to the right, thus deflecting the nozzle 15 as shown to a second position wherein the jet 17 is discharged along another axis omitted, for simplicity of representation, from the drawing, but defined as lying between the rearwardly extending axis 16 and the left-hand flap 18A. Although the jet 17 is moved toward the flap 18A, this movement is not intended to be of sufficient amplitude to bring the jet into contact therewith; hence, the angle through which the nozzle 15 must be deflected is relatively small. For providing control force in the opposite direction, the motor 49 is caused to deflect the nozzle 15, again through only a small angle, toward the second flap 18B to a similar position wherein the jet 17 is discharged along an axis lying between the rearwardly extending axis and the latter flap.

The dotted line 52 represents a connection or linkage between the nozzle-deflecting means 49 and a control unit 53 provided for governing the flow of fluid between a hydraulic power source (not shown) and the respective motors 33 of the flap-moving means. This linkage 52 should be such as to coordinate the flap moving motors 33 with the nozzle deflecting means 49 in such manner that the first, or left-hand, flap 18A undergoes translation transversely of its own axis when the nozzle 15 is deflected to its above-described second position, and this movement should be of sufficient amplitude to establish contact between the flap 18A and jet 17, the right-hand flap 18B being left in its neutral position. Deflection of the nozzle 15 to its third position is accompanied by similar movement of the right-hand flap 18B into contact with the jet 17. An advantage of this modification is that the nozzle 15 need not be deflected even so far as the correspondingly numbered nozzle shown in Figure 3, and the flaps 18A, 18B need not be moved so far as in the arrangement shown in Figure 4.

In another modification, shown in Figure 7, the means selectively operable for establishing the previously defined first and second spatial relationships between the flaps 18A, 18B and jet 17 again includes among its elements a movable means for directing the jet away from the rearwardly extending axis 16 and into peripheral contact with the flap inner face 21; as in none of the other modifications, however, this means may comprise either flap 18A or 18B which, as selected, may be employed as a movable means for deflecting the jet 17 into contact with the other flap 18A or 18B, which other flap is left immobile. Each of the flaps 18A, 18B is pivotally mounted on a fixed item, for example the shroud 24, and its hinge line 53 should be near the flap leading edge 32 and in a plane permitting movement of the flap trailing edge 22 toward and away from the rearwardly extending axis 16. According to a simple and convenient mode of construction, the hinge line 53 may lie well to one side of the centerline of the flap 18A or 18B in order that a fore-and-aft movement imparted to the leading edge 32 will effect displacement of the trailing edge 22 relative to the rearwardly extending axis 16.

A flap-deflecting means of this modification includes, for example, a pair of motors 54 preferably hydraulically energized and pivotally mounted on respective fixed items 60 and each having a chamber 58 mounting a piston-driven rod 59 which extends rearwardly therefrom into pivotal connection with the leading edge portion 32 of a respective flap 18A or 18B, the point of connection 64 in each case being laterally displaced from the flap hinge line 53. A control means 55 governing the supplying of the motors 54 with fluid from a pressure source (not shown) contains valving as required for making it selectively operable, as governed by an operator of the aircraft, for causing the motors 54 to pivot both the flaps 18A, 18B to a respective neutral position or first spatial relationship (similar to that shown in Figure 5) wherein the inner faces 21 of the flaps are adjacent and entirely out of contact with the periphery of the jet 17 while the latter issues along the rearwardly extending axis 16. The control means 55 further is operative for accomplishing the following additional functions. As needed, the control means 55 causes the motors 54 to maintain either one of the flaps 18A or 18B in its neutral position while pivoting the other into deep (more than peripheral) impingement upon the jet 17 for deflecting it away from the rearwardly directed axis 16 and into peripheral contact with the inner face 21 of the neutrally positioned flap 18A or 18B. For example, the left-hand flap 18A may be left neutrally positioned and the right-hand flap 18B deflected athwart a considerable portion of the jet 17. As the impinging flap 18B is of arcuate shape in cross-section, it blocks gaseous flow throughout much of the right-hand side of the jet 17, and the latter, obliged to find a new flowpath, is deflected to the left and into contact with the left-hand flap's inner surface 21. The control means, of course, should be operative for retaining either of the flaps 18A or 18B in its neutral position while returning the other from a deflected to a neutral position.

The control means for the motors 54 may be of any chosen kind capable of supplying hydraulic fluid thereto in a manner compatible with the mode of operation described above. As an example of the valving which may be employed by such means, Figure 8 shows a control means 55 with a pair of four-way valves 70, 71 individually and respectively connected to a pressure or return line 72 or 73 leading from a source of hydraulic power in the aircraft. The valve 70 is connected by lines 74, 75 to the chamber 58 of a respective motor 54 and is manually or remotely positionable by an operator of the aircraft, for connecting either end, as desired, of the related chamber 58 to the pressure line 72, the other end of the chamber 58 of course being connected at the same time to the return line 73. The remaining valve 71 is connected by lines 76, 77 to the chamber 58 of the other motor 54 and is similarly operable for connection of the chamber 58 of that motor to the hydraulic lines 72, 73 according to whether it is desired to extend or retract the piston rod of the motor.

While the pivoted flaps 18A, 18B (Figure 7) may be employed, in the same manner as explained above, with a tailpipe or nozzle having a fixed-diameter opening, they may also be used in association with a variable-area nozzle such as the nozzle 15 shown if provisions are made for adjusting their locations in their respective neutral positions in accordance with nozzle area changes. This function may be accomplished by an automatic, flap-moving means comprising a second chamber 56 and piston-operated rod 57 in each of the hydraulic motors 54. For example, the lefthand motor 54 has a forward rod 57 and chamber 56 made in tandem with the previously described chamber 58 and rod 59, and mounting of the motor 54 is accomplished by pivotally connecting the forward piston rod 57 to the fixed item 60. A similar forward chamber and piston are provided at the right-hand motor. The forward chambers 56 are supplied with hydraulic fluid through a second control unit 61 coordinated with the action of the nozzle area varying mechanism 63 by a suitable connection or linkage indicated by the broken line 62. When the nozzle area is decreased by the area varying mechanism 63, the second control means 61 causes pivoting of both flaps 18A, 18B inwardly by an amount sufficient to maintain a proper neutral-position spacing between them and the jet 17. When the nozzle opening 14 is increased in diameter, for instance to the degree shown in Figure 7, the second control means 61 supplies fluid as required to both forward chambers 56 for causing both flaps 18A, 18B to be pivoted outwardly to an extent suitable for properly maintaining the spacing between the neutrally positioned flaps 18A, 18B and the jet 17. The second control means 61 may be, as illustrated, a four-way valve having two ports connected by lines 78, 79 to the pressure and return ports of the hydraulic power source. A port of the valve 61 is connected by lines 80, 81 to the rear ends of the chambers 56 of the motors 54; the forward ends of the chambers 56 are connected to the remaining port by the lines 82, 83.

While only one embodiment of the invention has been shown, together with several modifications thereof, in the accompanying drawings, it will be evident that various other modifications are possible in the arrangement and construction of the flight control means components without departing from the scope of the invention.

We claim:

1. For an aircraft, a flight control means comprising: fixed structure of said aircraft; a nozzle conducting a gaseous flow and provided with an opening for the discharge of said flow in form of a jet along a first axis, said nozzle being deflectable relative to said fixed structure for bringing said jet to flow along a second axis; a flap mounted on said fixed structure in the vicinity of said opening, said flap being always laterally spaced from said jet when the latter flows along said first axis and contacted by said jet when the latter flows along said second axis; and means for deflecting said nozzle relative to said fixed structure and flap, whereby said flap, when contacted by said jet, deflects the latter in a direction away from said first and second axes and toward said flap.

2. For flight control of an aircraft, a device comprising: a nozzle rearwardly mounted on said aircraft and having an exhaust opening for the discharge of a gaseous jet along a flow-axis; and a flap which is mounted in the vicinity of said exhaust opening and which is translated laterally of said aircraft between a first position in which it is laterally spaced from said jet and a second position in which it is contacted by said jet, whereby said flow-axis of said jet is laterally deflected in the direction of said flap when the latter is in said second position.

3. On an aircraft, in combination, a nozzle deflectable relative to the longitudinal axis of said aircraft and operative for the rearward discharge of a propulsive jet along a rearwardly extending axis; structure of said aircraft distinct from said nozzle; a pair of blast flaps mounted on said structure on opposite sides of and radially spaced from said nozzle, said flaps extending well rearwardly of said nozzle; on each of said flaps, an inner face lying adjacent and discrete from said jet when the latter flows along said rearwardly extending axis, said inner face (in cross-section normal to said axis) substantially corresponding in shape to the peripheral contour of said jet and (in longitudinal section) most nearly approaching said axis at a point forwardly located on said flap and rearwardly thereof displaying progressively increasing divergence from said axis; and means for selectively deflecting said nozzle relative to said structure and flaps to a first position wherein said jet is directed along said rearwardly extending axis and to respective second and third positions wherein said jet is discharged in angular relation to said axis, said jet being brought into peripheral contact with said inner face of one of said flaps in said second position and into peripheral contact with said inner face of the other of said flaps in said third position, said progressively increasing divergence of each of said faces being such that said jet directed away from said axis and into contact with either one of said faces follows said face according to the Coanda effect and is further deflected from said axis.

4. For an aircraft provided with a nozzle having a rearward end for the discharge, along a rearwardly directed axis, of a propulsive jet, a flight-directing apparatus comprising: a pair of flaps movably mounted on said aircraft on opposite sides of and extending rearwardly of said nozzle; on each of said flaps, a respective inner face adjacent said jet, each of said inner faces, as seen in longitudinal section, most nearly approaching said axis at a point forwardly located on its respective flap and rearwardly therefrom displaying progressively increasing divergence from said axis, said point most nearly approaching said axis being always rearwardly spaced from said rearward end of said nozzle; and means translating each one of said flaps laterally of said aircraft between a first position wherein said inner face of said flap is entirely out of contact with said jet and a second position wherein said jet contacts said inner face, only one of said flaps being movable at a time to said second position thereof by said flap-moving means, said progressively increasing divergence of each of said inner faces being such that said jet when in contact with either one alone of said faces follows the same and is deflected away from the other of said inner faces and said rearwardly extending axis.

5. For an aircraft having an engine connected with a variable-area exhaust nozzle for the discharge, along a rearwardly extending axis, of a propulsive jet and provided with a nozzle-area varying mechanism operative for adjusting the width of said nozzle in at least a given plane including said axis, a flight-control apparatus comprising: a pair of blast flaps mounted on said aircraft on opposite sides of and extending well rearwardly of said nozzle, each of said blast flaps having an inner face intersected by said given plane and further having a neutral position wherein said inner face lies adjacent and entirely out of contact with the periphery of said jet and displays rearwardly increasing divergence from said rearwardly extending axis, the location of said flap relative to said rearwardly extending axis when in said neutral position being variable in accordance with the diameter of said nozzle in said given plane; first means operable for selectively leaving either one of said flaps in said neutral position thereof while moving the other of said flaps transversely and into contact with an adjacent, peripheral portion of said jet; and second, automatic means coordinated with said nozzle-area varying mechanism and operative for adjusting the locations of said flaps in said respective neutral positions thereof in accordance with changes made by said mechanism in the diameter of said nozzle in said given plane; said rearwardly increasing divergence from said rearwardly extending axis displayed by each one of said inner faces being of such nature that said peripheral portion of said jet contacted by said inner face of said transversely moved flap follows the contour of said face and effects deflection of said jet toward said face and away from said rearwardly extending axis.

6. On an aircraft, in combination, a nozzle deflectable relative to the longitudinal axis of said aircraft and operative for the generally rearward discharge of a propulsive jet; a pair of blast flaps mounted on said aircraft on opposite sides of and diametrically spaced from said nozzle, said flaps extending well rearwardly of said nozzle; on each of said flaps, an inner face lying adjacent and discrete from said jet when the latter flows along said rearwardly extending axis, said inner face (in cross-section normal to said axis) substantially corresponding in shape to the peripheral contour of said jet and (in longitudinal section) most nearly approaching said axis at a point forwardly located on said flap and rearwardly thereof displaying progressively increasing divergence from said axis; nozzle deflecting means selectively operative for deflecting said nozzle to a first position wherein said jet is directed along said rearwardly extending axis, a second position wherein said jet is discharged along an axis lying between said rearwardly extending axis and a first one of said flaps, and a third position wherein said jet is discharged along an axis lying between said rearwardly extending axis and the second of said flaps; and flap-moving means coordinated with said nozzle-actuating means and operative for effecting transverse movement of said first flap toward said rearwardly extending axis when said nozzle-actuating means deflects said nozzle ot said second position, said movement being sufficient to establish contact between said inner face of said first flap and the prepihery of said jet, said flap-actuating means further being operative for effecting a similar and equivalent movement of said second flap when said nozzle-actuating means deflects said nozzle to said third position, said progressively increasing divergence of each of said inner faces being such that upon establishment of contact between either one of said faces and said jet, said jet follows said face and is directed along an axis still further removed from said rearwardly extending axis.

7. For an aircraft provided with an engine having a nozzle for the discharge, along a rearwardly directed axis, of a propulsive jet, a flight-directing apparatus comprising: a pair of blast flaps pivotally mounted on said aircraft on opposite sides of and extending rearwardly of said nozzle, each of said flaps having an outer and an inner face, said inner face thereof lying the nearer to said rearwardly directed axis, each of said flaps being pivotable to a neutral position wherein said inner face thereof is adjacent the periphery of and entirely out of contact with said jet; and flap-deflecting means connected to said flaps and operable for maintaining either one of said flaps in said neutral position thereof while pivoting the other into impingement upon said propulsive jet for deflecting said jet away from said rearwardly directed axis and into peripheral contact with said inner face of said neutrally positioned flap, each one of said inner faces being so formed, located, and contoured that when its respective flap is neutrally positioned and said jet is brought into peripheral contact therewith, said jet follows the contour of said inner face according to the Coanda effect and is further deflected away from said rearwardly extending axis.

8. A flight-directing apparatus such as claimed in claim 7, said inboard surfaces, as seen in lateral cross-section through said flaps taken generally normal to said rearwardly extending axis, being dished and lying substantially concentric with the peripheral contour of said propulsive jet.

9. An apparatus such as claimed in claim 7, each of said flaps being constructed in the form of a streamlined airfoil whose spanwise centerline substantially defines an arc.

10. An apparatus such as claimed in claim 8, said flap-deflecting means further being operative for retaining a one of said flaps in said neutral position thereof while returning to said neutral position thereof another of said flaps previously pivoted into impingement upon said jet.

11. For an aircraft provided with an engine having a nozzle for the discharge, along a rearwardly directed axis, of a propulsive jet, a flight-directing apparatus comprising: a pair of blast flaps pivotally mounted near their forward edges on said aircraft on opposite sides of and extending rearwardly of said nozzle, each of said flaps having an inner face nearer said jet and being shaped, in lateral cross-section taken generally normal to said rearwardly extending axis, to correspond generally to the peripheral contour of said jet, each of said flaps being pivotable to a respective neutral position wherein said inner face thereof is near the periphery of and entirely out of contact with said jet; and flap-deflecting means of a sort selectively operable for positioning both of said flaps in said respective neutral positions thereof and for positioning either one of said flaps in said neutral position thereof while pivoting the other against said jet for deflecting the latter from said rearwardly extending axis and into at least peripheral contact with said inner face of said neutrally positioned flap; each one of said inner faces further being of a sort so formed and shaped, and so located when its respective flap is neutrally positioned, that said jet, when deflected into peripheral contact therewith, follows said inner face and is further deflected away from said rearwardly extending axis.

12. An apparatus such as claimed in claim 11, each of said flaps having a foremost edge and said inner surface of each of said flaps most closely approaching said rearwardly extending axis at a location near said foremost edge and rearwardly of said location curving distinctly away from said rearwardly extending axis.

13. An apparatus such as claimed in claim 11, said flap-deflecting means including a pair of motors secured on fixed parts of said aircraft, each of said motors having an operable connection with a respective one of said flaps, said flap-deflecting means further including control means connected to said motors and selectively operable for effecting energization of said motors for positioning said flaps.

14. For an aircraft having an engine connected with a variable-area exhaust nozzle for the discharge, along a rearwardly extending axis, of a propulsive jet and provided with a nozz'e-area varying mechanism operative for adjusting the width of said nozzle in at least a given plane including said axis, a flight-control apparatus comprising: a pair of blast flaps pivotally mounted on said aircraft on opposite sides of and extending well rearwardly of said nozzle, each of said flaps having an inner face intersected by said given plane and further having a neutral position wherein said inner face lies adjacent the periphery of and entirely out of contact with said jet and displays rearwardly and progressively increasing divergence from said rearwardly extending axis, the location of said flap relative to said rearwardly extending axis when in said neutral position being variable in accordance with the diameter of said nozzle in said given plane; first means operable for selectively leaving either one of said flaps in said neutral position thereof while pivoting the other of said flaps into impingement upon said jet for deflecting the latter from said rearwardly extending axis sufficiently to bring it into peripheral contact with said inner surface of said flap left in said neutral position thereof; and second, automatic means coordinated with said nozzle-area varying mechanism and operative for adjusting the locations of said flaps in said respective neutral positions thereof in accordance with changes made by said mechanism in the diameter of said nozzle in said given plane, said rearwardly and progressively increasing divergence from said rearwardly extending axis displayed by each one of said inner surfaces being of such nature that said jet deflected into peripheral contact with said inner surface of said flap left in said neutral position thereof follows the contour of said inner surface and is further deflected away from said rearwardly extending axis.

15. An apparatus such as claimed in claim 14, said first flap deflecting means including first motor means connected to said aircraft and to said flaps and further including first control means operable for controlling energization of said first motor means; and said second, automatic means including second motor means connected to said aircraft and to said flaps, and further including second control means connected to said second motor means and to said mechanism for adjusting said nozzle and responsive to operation of the latter for automatically controlling energization of said second motor means in accordance with said operation of said nozzle-adjusting mechanism.

16. An apparatus such as claimed in claim 14, said first, flap-deflecting means including a first pair of motors each having connection to said aircraft and to a respective one of said flaps and further including independently operable first control means connected to said first pair of motors for controlling energization thereof, said connection of each of said first pair of motors to a respective one of said flaps being through a respective one of a second pair of motors recited below; and said second, automatic means including a second pair of motors each having connection to said aircraft and to a respective one of said flaps, and second control means connected to said second pair of motors and to said mechanism for adjusting said nozzle, said second control means being responsive to operation of said nozzle-adjusting mechanism for controlling energization of said second pair of motors in accordance therewith.

17. For an aircraft provided with an engine having a variable-area exhaust nozzle for the discharge, along a rearwardly extending axis, of a propulsive jet and further provided with a mechanism for adjusting said nozzle for varying the cross-sectional diameter thereof in a plane including said rearwardly extending axis, a flight-control apparatus comprising: a pair of blast flaps pivotally mounted on said aircraft on opposite sides of said nozzle, each of said flaps having an inner face extending rearwardly of said nozzle and further having a leading and trailing edge, said inner face of each of said flaps, as seen in cross-section taken athwart a line extending between said leading and trailing edges, being arcuately shaped to correspond substantially to the peripheral contour of said jet, each of said flaps having a neutral position wherein said inner face thereof lies adjacent the periphery of and out of contact with said jet, said neutral position being variable in location relative to said rearwardly extending axis in accordance with variations which may be made in the diameter of said nozzle; a first, double-chambered hydraulic cylinder having first and second pistons connected respectively to one of said flaps and to said aircraft; a second, similar, hydraulic cylinder similarly connected to the other of said flaps and to said aircraft; first control means operable for selectively controlling fluid flow between said cylinders and a hydraulic power source for causing said first pistons of said cylinders to deflect said flaps in modes including the individual deflection of either flap to and from its neutral position and further including deflection of either one of said flaps to its neutral position while deflecting the other out of its neutral position, deflection of either one of said flaps out of its neutral position resulting in its impingement on said jet and deflection of the latter away from said rearwardly extending axis and into at least peripheral contact with said inner face of the other of said flaps; second control means responsive to operation of said mechanism for adjusting said nozzle and automatically operative for controlling fluid flow between each of said cylinders and a hydraulic power source for causing said second pistons of said cylinders to move said flaps as required for adjusting said flaps in said neutral positions thereof in accordance with variations in diameter of said nozzle, said inner face, in the case of each of said flaps when neutrally positioned, most closely approaching said rearwardly extending axis at a location near said leading edge and rearwardly thereof progressively and distinctly diverging from said axis in such manner that said jet, when deflected against said inner surface of a neutrally positioned one of said flaps, by the other of said flaps follows said inner face according to the Coanda effect and is further deflected away from said rearwardly extending axis and said other of said flaps.

References Cited in the file of this patent

UNITED STATES PATENTS

| 2,499,401 | Madden | Mar. 7, 1950 |
| 2,603,062 | Weiler et al. | July 15, 1952 |
| 2,654,552 | Jonas | Oct. 6, 1953 |
| 2,694,898 | Stauff | Nov. 23, 1954 |
| 2,758,805 | Graham | Aug. 14, 1956 |
| 2,765,993 | Custer | Oct. 9, 1956 |
| 2,770,095 | Ashwood et al. | Nov. 13, 1956 |
| 2,793,493 | Kadosch et al. | May 28, 1957 |
| 2,793,494 | Kadosch et al. | May 28, 1957 |
| 2,799,989 | Kappus | July 23, 1957 |
| 2,846,164 | Haberkorn | Aug. 5, 1958 |
| 2,846,844 | O'Rourke | Aug. 12, 1958 |
| 2,875,578 | Kadosch et al. | Mar. 3, 1959 |

FOREIGN PATENTS

| 62,474 | France | Jan. 19, 1955 |
| 63,348 | France | Mar. 30, 1955 |
| | (2nd addition to 1,030,483) | |
| 1,025,715 | France | Jan. 28, 1953 |
| 1,112,592 | France | Nov. 16, 1955 |
| 600,397 | Great Britain | Apr. 7, 1948 |